United States Patent
Guy et al.

(10) Patent No.: US 8,960,023 B2
(45) Date of Patent: Feb. 24, 2015

(54) WIND TURBINE BLADE TESTER

(75) Inventors: Stuart Guy, Lockerley (GB); Tim Erskine, Newport (GB)

(73) Assignee: Vestas Wind Systems A/S, Aarhus N. (DK)

( * ) Notice: Subject to any disclaimer, the term of this patent is extended or adjusted under 35 U.S.C. 154(b) by 220 days.

(21) Appl. No.: 13/338,745

(22) Filed: Dec. 28, 2011

(65) Prior Publication Data

US 2012/0227515 A1 Sep. 13, 2012

Related U.S. Application Data

(60) Provisional application No. 61/490,372, filed on May 26, 2011.

(30) Foreign Application Priority Data

Mar. 7, 2011 (GB) .................... 1103861.9

(51) Int. Cl.
*G01L 1/04* (2006.01)
*F03D 11/00* (2006.01)
*G01M 5/00* (2006.01)
*G01M 7/08* (2006.01)

(52) U.S. Cl.
CPC ......... *F03D 11/0091* (2013.01); *G01M 5/0016* (2013.01); *G01M 5/0033* (2013.01); *G01M 5/0066* (2013.01); *G01M 5/0075* (2013.01); *G01M 7/08* (2013.01); *F05B 2260/83* (2013.01); *Y02E 10/722* (2013.01)
USPC .................................... 73/862.627

(58) Field of Classification Search
USPC ...................................... 73/862.627
See application file for complete search history.

(56) References Cited

U.S. PATENT DOCUMENTS

| 6,718,833 | B2 * | 4/2004 | Xie et al. .................. 73/812 |
| 7,953,561 | B2 * | 5/2011 | Musial et al. ............. 702/42 |
| 2006/0037402 | A1 | 2/2006 | Musial et al. |
| 2010/0263448 | A1 * | 10/2010 | Hughes et al. ............ 73/577 |
| 2010/0275695 | A1 * | 11/2010 | Cotrell et al. ............ 73/663 |

FOREIGN PATENT DOCUMENTS

| CN | 201408112 | 2/2010 |
| CN | 201540229 | 8/2010 |
| WO | 2008/145727 | 12/2008 |
| WO | 2009/097055 | 8/2009 |

OTHER PUBLICATIONS

James Paddock; Search Report issued in priority Great Britain Application No. GB1103861.9; Jul. 8, 2011; 4 pages; Great Britain Intellectual Property Office.

* cited by examiner

*Primary Examiner* — Lisa Caputo
*Assistant Examiner* — Octavia Hollington
(74) *Attorney, Agent, or Firm* — Wood, Herron & Evans, LLP

(57) ABSTRACT

A wind turbine blade tester includes a pair of linearly reciprocable actuators, such as hydraulic actuators. Each of the actuators is arranged to deliver a stroke to a wind turbine blade being tested. The stroke delivered by each of the actuators provides a controlled force in both the edgewise and flapwise directions. A method for testing a wind turbine blade is also disclosed.

20 Claims, 6 Drawing Sheets

WIND TURBINE BLADE TESTER

CROSS-REFERENCE TO RELATED APPLICATIONS

This application claims priority under 35 U.S.C. §119(a) to GB Application No. 1103861.9, filed Mar. 7, 2011. This application also claims the benefit of U.S. Provisional Application No. 61/490,372, filed May 26, 2011. Each of these applications is incorporated by reference herein in its entirety.

TECHNICAL FIELD

The invention relates to a wind turbine blade tester and a method of testing a wind turbine blade. It relates in particular to a wind turbine blade testers suitable for testing wind turbine blades for use in large scale electricity generation on a wind farm, for example.

BACKGROUND

Wind turbine blades for use in large scale wind turbines on wind farms are becoming ever bigger. For example, blade lengths may be over 50 m. New designs of these ever larger blades are typically mechanically fatigue tested before being put into use to ensure that they will be reliable for the service life of the wind turbine.

In normal use, wind turbine blades oscillate as they rotate as the forces acting on them change. Wind turbine blades are subjected to two types of load namely aerodynamic load (in the form of, for example, lift, drag and shear) and inertial load (in the form of, for example, gravity and blade dynamics). Loads are seen in both the flapwise and edgewise directions of a wind turbine blade 10 as illustrated in, for example, FIG. 1. The edgewise direction is the direction of rotation of the wind turbine blade, in use, and the flapwise direction is perpendicular to this and also perpendicular to the longitudinal axis of the blade. Aerodynamic bending moments are generally associated with the flapwise direction. These are mainly attributed to stochastic wind speed, that is to say, turbulence. The inertial loads are generally associated with the edgewise direction. The loads are attributable, in the main, to gravity loads experienced during each rotation of the blade and are more deterministic in nature. In small blades, loads in the flapwise direction dominate the edgewise loads. Thus, small blades can be adequately tested only in one direction (flapwise). However, with today's larger blades, the edgewise loads become more significant as a blade's gravity load increases greater proportionally than its wind load with blade length. Therefore, for larger blades, single axis testing does not provide a valid test and biaxial testing is required.

Blade testing is typically done by exciting the blade at its natural frequency (the frequency a system naturally vibrates once it has been put into motion). In this way, it is possible to emulate the required test bending moments across the whole blade. Longer turbine blades have lower natural frequencies and test times increase as blades are usually required to be tested for a particular number of oscillations. Furthermore, the edgewise and flapwise natural frequencies are different. The edgewise natural frequency of a wind turbine blade is higher than the flapwise natural frequency. A typical test time for which a blade might be oscillated continuously at the natural frequency in each direction is of the order of 3 months. Adding to this burden, newer, longer blades are increasingly flexible, which requires more energy to oscillate them.

In a simple test arrangement (not shown), typically housed in a large building to cover the blade being tested, one end of a wind turbine blade (that which would, in use be connected to the hub of the wind turbine) is fixed to a substantial concrete support that may weigh several thousand tons to support the substantial loads applied to the blade during testing. The other end of the blade is oscillated in one direction to test it in that direction by applying an oscillating mass to the upper surface of the wind turbine oscillating at the natural frequency of the blade in the direction it is oscillating, for example, for three months. The oscillating mass is typically a mass mounted to a rotating electric motor. Once the test is completed, the wind turbine blade is rotated 90° and an oscillating mass is applied to what is now the upper surface of the wind turbine blade and the test is repeated at a different frequency corresponding to the natural frequency of the blade in the direction it is now oscillating again for, for example, three months.

A number of biaxial fatigue testing arrangements are known to test the blade simultaneously in two directions (flapwise and edgewise). Clearly, this would reduce the overall test time of the wind turbine blade. However, correct control is extremely difficult. This is because, as mentioned above, the blade should be oscillated at different frequencies in the edgewise and flapwise directions. Typically, the oscillation in one of these directions affects the oscillation in the other direction.

US patent application No. US2006/0037402 describes one arrangement that allows for simultaneous biaxial testing. The mechanism for applying flapwise loads includes an actuator and a mass mounted on the wind turbine blade being tested. A control system controls the actuator to linearly reciprocate the mass in the flapwise direction at about the resonant frequency of the wind turbine blade being tested. Another mechanism applies edgewise loads to the wind turbine blade being tested. This mechanism includes another actuator coupled to the wind turbine blade being tested by a pivotally-mounted bell crank and a pushrod. The control system controls edgewise testing too.

The use of a heavy oscillating or reciprocating mass on the blade increases the mass of the blade being tested, which increases the natural frequency of the blade being tested. Furthermore, this arrangement is inefficient and difficult to control because the angle of the pushrod is always changing over time. This testing system is also large in size.

Another arrangement for simultaneous biaxial testing is described in international patent application No. WO 2009/097055. In this arrangement, the wind turbine blade under test is mounted to a frame. Actuators moving perpendicular to one another act on the frame on different sides of the blade. One actuator provides flapwise loads by applying force to a lever arm or fin connected to the wind turbine blade being tested and causing the wind turbine blade to oscillate. The other actuator provides edgewise loads by applying a force to cause linear displacement. The actuators are operated by a control system with displacement provided at natural or other frequencies. The control system uses a feedback loop that receives data from sensors, such as strain gauges, located on the flap and edge portions of the blade.

This arrangement requires large forces to be provided by the actuators in the edgewise direction, in particular, and like the other prior art arrangement described above, it is difficult to control and is large in size.

Both of the biaxial test arrangements of US patent application No. US2006/0037402 and international patent application No. WO 2009/097055 described above have actuators that act on the wind turbine blade orthogonal to one another.

The inventors of the wind turbine blade tester described below are the first to appreciate that a wind turbine blade and, in particular, a large wind turbine blade that might be used on a wind turbine on a wind farm, can be adequately tested in the flapwise and edgewise directions simultaneously using a pair of linearly reciprocable actuators, such as hydraulic actuators, each arranged to deliver a stroke to a wind turbine blade being tested and the stroke delivered by each of the actuators provides a controlled force in the edgewise and flapwise directions.

Wind turbine blades have low stiffness in the flapwise direction and, therefore, require high displacement in this direction to achieve the target bending moments and aerodynamic damping in this direction is the predominant factor. In contrast, the edgewise direction only requires forces to overcome the relatively low structural damping. Thus, required forces to overcome the above-mentioned forces are much greater in the flapwise direction than in the edgewise direction. This is provided by examples of the arrangement described herein. Running the test at the natural frequency of the wind turbine blade being tested means that resonance occurs (resonance is the build-up of large amplitude that occurs when a wind turbine blade is excited at its natural frequency), and the only force required is that to overcome the structural and aerodynamic damping of the blade. In this case, typically, the ratio of flapwise forces to edgewise forces is 10:1.

Examples of the wind turbine blade tester described herein provide, quick, efficient and reliable testing of wind turbine blades in two directions (edgewise and flapwise) simultaneously in a compact design. Examples require only low ground clearance below the blade being tested. Generally, this allows for better optimisation of wind turbine blade design and, as a result, shorter times to bring a new product to market. Example blade testers described can compensate for changes in actuator angle.

By exciting the blade being tested at its natural frequency, the required local bending moments can be achieved by mass distribution. This allows for low energy required per test and relatively low required excitation forces. As a result of the latter effect, the required relative strength of the test equipment is low, which reduces costs.

Examples of the wind turbine blade tester described herein also provide advantages as regards single axis testing. They restrain movement in the axis along which the blade is not being tested and this reduces cross-coupling between the edgewise and flapwise directions. The blade does not require pitching between edgewise and flapwise testing. Also, example turbine blade testers used in single axis testing also provide correct mean loads for edgewise testing.

SUMMARY

The invention in its various aspects is defined in the independent claims below. Advantageous features are defined in the dependent claims below.

An exemplary embodiment of the invention is described in more detail below and takes the form of a wind turbine blade tester comprising a pair of linearly reciprocable actuators, such as hydraulic actuators. Each of the actuators is arranged to deliver a stroke to a wind turbine blade being tested. The stroke delivered by each of the actuators provides a controlled force in both the edgewise and flapwise directions.

This arrangement allows loading of a wind turbine blade being tested to be readily controllable in two axes (flapwise and edgewise) simultaneously. Alternatively, it allows for stable testing in a single axis (flapwise or edgewise) as it can restrain movement in the axis not being tested. For single axis testing, with the arrangement described herein, the blade being tested would not need to be pitched between edgewise and flapwise tests (and vice versa). Also, for single axis testing, with the arrangement described herein, correct mean loads may be provided for edgewise testing reflecting those experienced in actual use in the field. Known edgewise fatigue tests have high edgewise mean loads and zero flapwise mean loads. In contrast, in use in the field, wind turbine blades have high flapwise mean loads and zero edgewise mean loads.

The arrangement allows testing to be carried out in a realistic and accurate manner.

Embodiments have a low cycle time as they do not use a heavy rotating mass on the blade being tested, which increases the natural frequency of the blade. Furthermore, the force may be higher than rotating masses allow for the testing of larger blades.

The actuators may each be inclined at an angle relative to the wind turbine blade being tested. This provides a compact configuration.

The actuators may both be arranged to deliver a stroke to the same side of the wind turbine blade being tested. This provides a particularly compact configuration.

Each of the actuators may be separately controlled. Each of the actuators may be separately controlled by a closed loop controller.

The actuators may be hydraulic actuators or rams. This allows the tester to achieve high amplitudes. This is important as modern wind turbine blades are very flexible and require high amplitudes (and indeed high energy) to oscillate them.

The actuators may be arranged to be connected to the ground. One of the actuators may be at an acute angle and the other actuator may be at an obtuse angle to the ground. The actuators may be arranged at an acute angle to one another. The acute angle between the actuators may be less than 70°, less than 45°, or less than 35°.

The ends of the actuators may be spaced apart at the wind turbine blade being tested. Alternatively, the actuators may be coaxial at the wind turbine blade being tested.

Sensors may be provided for mounting spaced apart along the wind turbine blade being tested. The sensors may comprise strain gauges. At least some of the sensors may be adapted to measure strain in two orthogonal directions of the wind turbine blade being tested.

In an aspect of the invention, there is provided a method of testing a wind turbine blade comprising: controlling both of a pair of linearly reciprocable actuators to both deliver a stroke to a wind turbine blade being tested with a force in both the edgewise and flapwise directions.

BRIEF DESCRIPTION OF THE DRAWINGS

Various embodiments of the invention will now be described, by way of example, and with reference to the drawings in which.

DETAILED DESCRIPTION

Figure 1:
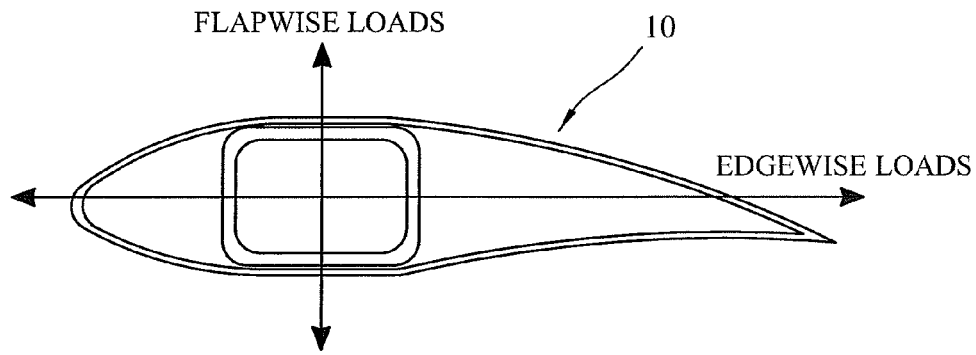
FIG. 1 is a schematic showing naming conventions of forces acting on a wind turbine blade.
Figure 2:
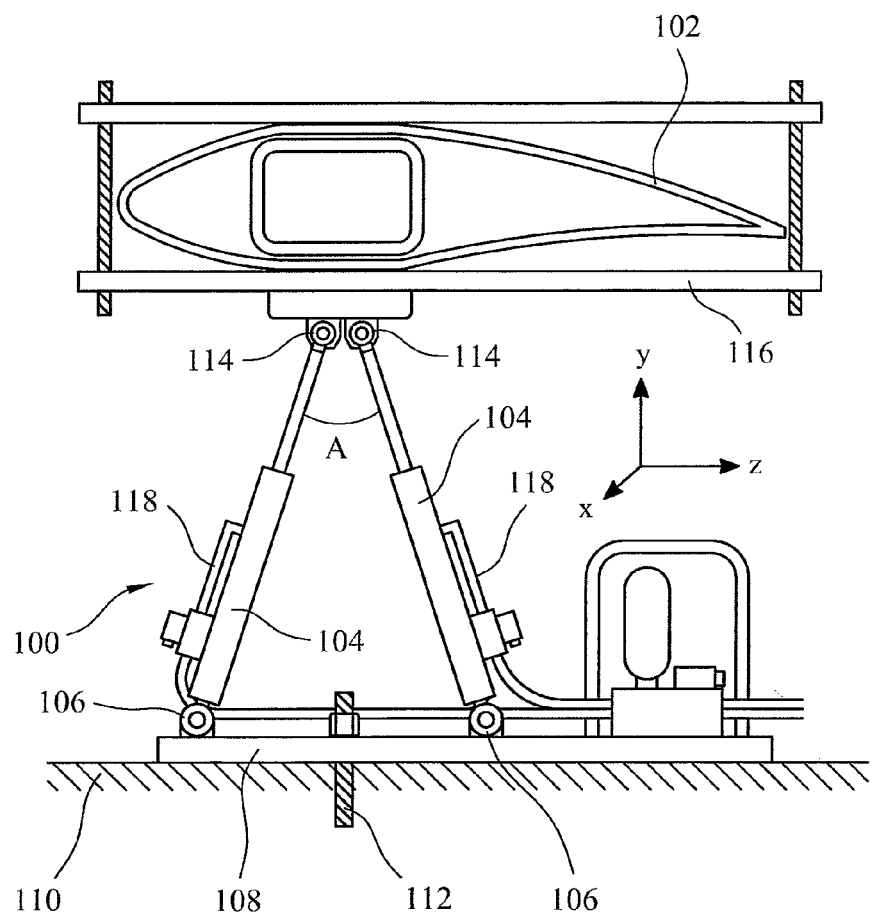
FIG. 2 is an end view of a cross-section of a wind turbine blade tester embodying an aspect of the present invention.

FIG. 2 illustrates in a wind turbine blade tester 100, embodying aspects of the present invention, in which a wind turbine blade 102 is being tested. Briefly, the wind turbine blade tester uses hydraulic proportional excitation or proportional valves in a hydraulic actuator to generate a sinusoidal input force on the wind turbine blade being tested that is maintained by a closed loop control system. This eliminates transient loads, whilst retaining the load capability of hydraulic actuators and providing load stability.

One end of the blade 102 being tested, in normal use connected to a hub of the wind turbine, is connected to a large fixed mass. The tester 100 acts on a part of the blade spaced from the fixed end towards the tip of the blade.

The tester or fatigue tester 100 is generally in the form of a so-called parallel manipulator. It comprises a pair of linearly reciprocable actuators 104 each arranged to deliver a stroke or displacement to a wind turbine blade 102 being tested. The actuators are each inclined at an angle relative to the wind turbine blade being tested. They both act on the same side, face or surface of the wind turbine blade being tested.

In this example, the actuators 104 are hydraulic actuators or rams. Hydraulic actuators have a high load capability that is most suitable for testing modern, large wind turbine blades.

One end 106 of each actuator 104 is fastened to a base 108. The base is connected to the floor or ground 110 of a test building by connectors such as nuts and bolts 112. Thus, an end of each of the actuators is fixed relative to an end of the other actuator. By floor mounting the exciter or hydraulic actuator, high loads can be input and there are no unwanted mean loads on the blade (such as is the case when an oscillating mass is placed on the blade 102 to oscillate it as described above with reference to US patent application No. US2006/0037402). This free end of each actuator is connected to a clamp assembly 116 that clamps or holds a portion of the wind turbine blade being tested.

The actuators 104 are each inclined at an angle relative to the wind turbine blade 102 being tested. The free end 114 of each actuator projects in a direction generally upwardly from the base 108. In this example, one of the actuators is at an acute angle to the ground 110 and the other is at an obtuse angle to the ground; the actuators are at an acute angle relative to one another. The actuators are spaced apart, at their free ends, in the edgewise direction. The actuators extend in the edgewise direction too. The angle between the actuators is adjustable. The selection of the angle depends on the flapwise to edgewise force ratio. In this example, the angle between the actuators is less than 35° and, in particular, 30.01521644°. Other angles between the actuators are possible such as less than 70°, or less than 45°.

The actuators 104 include servo valves 118 that control the flow of hydraulic fluid to its actuator and thus its displacement. The servo valves 118 of the hydraulic actuators 104 are proportional valves. They generate a sinusoidal or oscillating force in the hydraulic actuators. This eliminates transient loads and retains the load capability that hydraulic actuators provide whilst also providing load stability. The hydraulic actuators, and the proportional valves in particular, are controlled by a closed loop control system that is described below.

The actuators 104 are dual piston devices with symmetric bore and annulus. This ensures a symmetric loop response in both directions.

Figure 3:
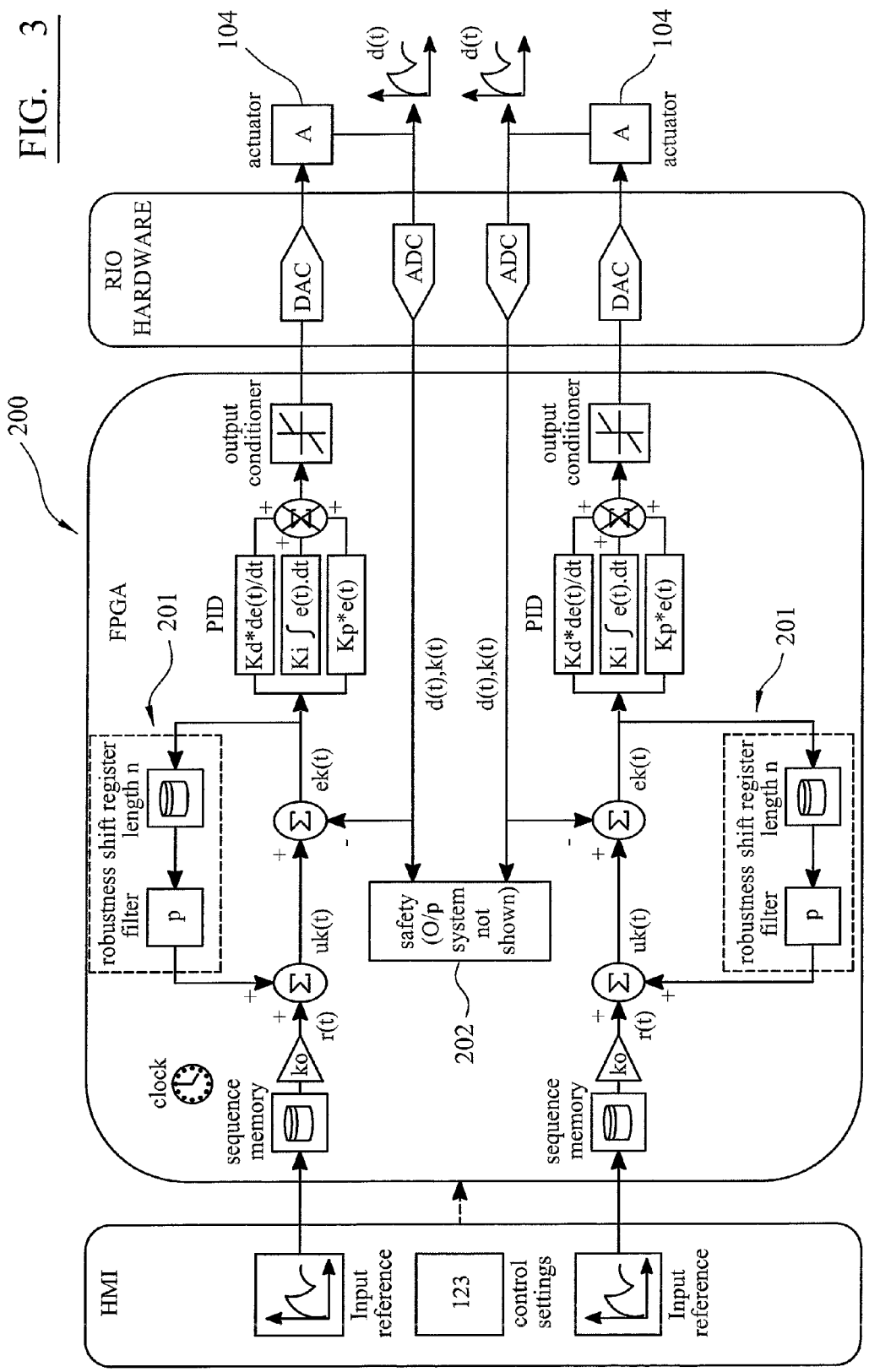
FIG. 3 is a schematic of a control system of a wind turbine blade tester embodying an aspect of the present invention.

As mentioned above, the wind turbine blade tester 100 includes a controller 200 illustrated in FIG. 3. The controller controls the blade tester such that the stroke or displacement delivered by each of the actuators 104 provides a controlled force in the edgewise and flapwise directions of the blade 102 being tested. In this example, the controller controls the wind turbine blade tester and, in particular, its actuators, such that the blade being tested is oscillated simultaneously at different natural frequencies of the wind turbine blade in the edgewise and flapwise directions. Alternatively, the controller may control the wind turbine blade tester and, in particular, its actuators, such that the blade being tested is oscillated only in one direction (flapwise or edgewise) at the natural frequency in that direction.

As there are two actuators 104 controlled, there are two degrees of freedom to control, in the edgewise (z axis shown in FIG. 2) and flapwise direction (y axis shown in FIG. 2). In practice, there is also a small amount of uncontrolled movement along the longitudinal axis of the wind turbine blade 102 (along the x axis of FIG. 2).

Additionally, the two actuators 104 can be controlled to provide rotational movement of the blade 102 if desired.

The controller 200 receives signals from sensors (not shown), in the form of strain gauges, mounted, spaced apart, along the wind turbine blade 102 being tested. The controller controls the pair of actuators' 104 displacements or strokes, using displacement feedback, such that forces acting on the wind turbine blade being tested in the flapwise and edgewise directions are separately controlled.

In this example, sensors are mounted at discrete points spaced along the wind turbine blade 102 being tested. There may be, for example, between 20 and 100 sensors spaced along the blade. Specifically, in this example, 44 sensors are spaced apart along the blade. The number of sensors is proportional to the length of the blade being tested. Each of the sensors is adapted to measure strain in two orthogonal directions (horizontal and vertical/the edgewise and the flapwise direction) of the wind turbine blade being tested. In this way, the desired strain amplitude in the blade can be achieved in both flapwise and edgewise directions. Strains generated from calibrations are targeted.

The control system 200 of FIG. 3 provides position control of the actuators 104; it works in position mode. It ensures that the displacement profile of the actuators is followed with invariance to the stochastic reactive loads. The control system has a sequenced reference. That is to say, the reference is a predetermined displacement sequence. The control system is highly reliable to ensure low down-time and fail-safe arrangements.

The control system 200 of FIG. 3 is a so-called intelligent control architecture known as an iterative learning control (ILC) system.

The ILC operates by writing and storing an error signal history in memory and importing it back into the loop on the next iteration or time step. It is embedded on a field programmable gate array (FPGA). This allows for fast control or loop speed of the order of MHz. This is many orders of magnitude above the rate of oscillation of the wind turbine blade 102 and thus ensures that the control system 200 is not the limiting factor. This is important as the system being controlled is highly dynamic. The ILC allows performance of the control to be improved by using past experience to reduce error. The ILC has a generalised set of tuning parameters, which are optimised on each application by "self-tuning". This overcomes the problem of tuning the system bearing in mind that the system is not deterministic and the hydraulic or actuator systems' behaviour is non-linear and thus it would be problematic to find a tuning function to fit all areas of the sequence.

In the control system 200 of FIG. 3, for each of the pair of actuators 104, time series error history $e_k$ (t) is fed back around a closed loop or feedback loop 201 into a reference signal $u_k$ (t) at its corresponding time stamp within a sequence. The feedback is first passed through a shift register of length n and filter P(q) to attenuate its effect such that the reference and the actual position converge after a maximum number of sequences $u_{k+n}$ (t). This is reflected in the formula:

$$u_{k+1}(t) = L(q)u_k(t) + P(q)e_k(t).$$

The error signals for each iteration are passed through a PID (proportional-integral-derivative) algorithm defined by:

$$u(t) = MV(t) = K_p e(t) + K_i \int_0^t e(\tau)d\tau + K_d \frac{d}{dt}e(t)$$

where $K_n$ is a constant for the proportional part ($K_p$), integral part ($K_i$) and derivative part ($K_d$) of the PID controller.

An output conditioner is applied to the output from the PID system. This applies maximum slew rates, saturation levels, zero calibration and other functions to ensure high performance.

The sequence within memory is also subject to an overall gain level $K_0$ (the default is a gain of 1), to allow a user to make minor adjustments to the target level.

Two control loops 201 of the type described above are included, one to control each of the actuators 104 of the pair of actuators. However, these loops are inherently coupled as movement of one actuator impacts on the other. This is an effect the FPGA handles effectively as it provides for parallel processing and each control loop has equal processing resources and they can be synchronised.

The control system 200 also includes a safety system or safety lockout system 202. This receives an input from the actuator 104 and the strain gauges mounted on the blade 102 being tested. This ensures that maximum error tolerances or maximum reactive forces are not exceeded. In the event of either of these maxima being exceeded, a safety manifold is activated in the hydraulic system and the system comes to a rest. That is to say, actuator movement is slowly stopped. Furthermore, registers of the ILC storing the tuned parameters are cleared. This prevents immediate return to the exceeded maximum forces.

The control system 200 includes a reconfigurable input/output (RIO) to acquire a feedback signal via an analogue-to-digital converter (ADC) for each actuator 104 and to drive the servo valves of each actuator via a digital-to-analogue converter (DAC).

Additionally, the control system 200 includes a human machine interface (HMI) for user control using an embedded real time computer.

Figure 4A:
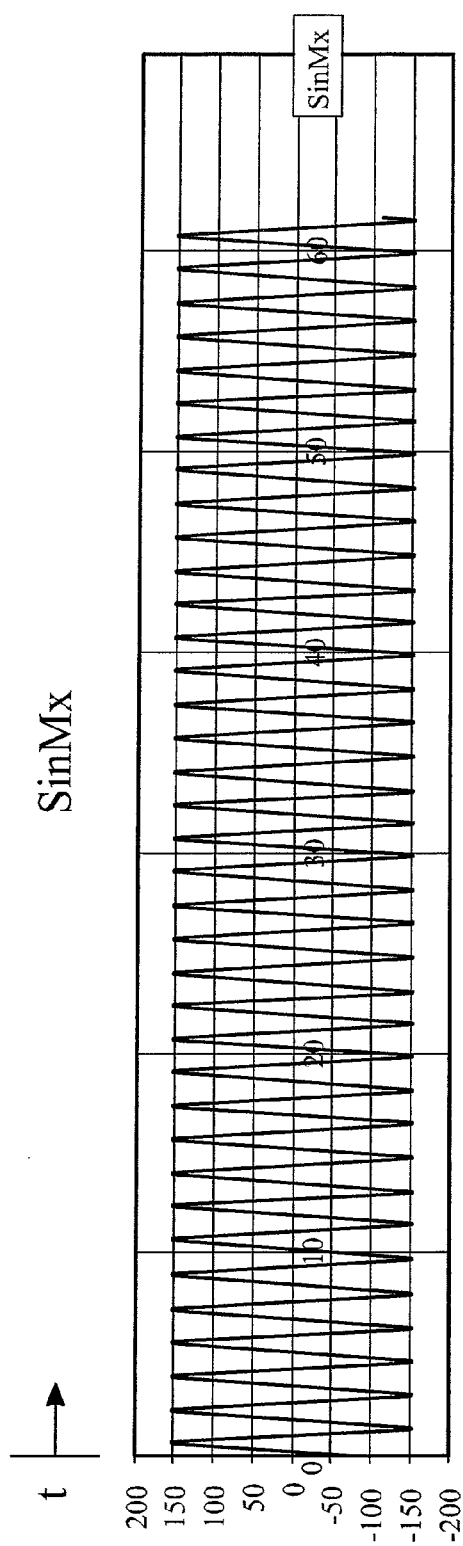
FIGS. 4A and 4B are graphs showing displacement, at a single reference point in one plane, of an actuator of a wind turbine blade tester embodying an aspect of the present invention.
Figure 4B:
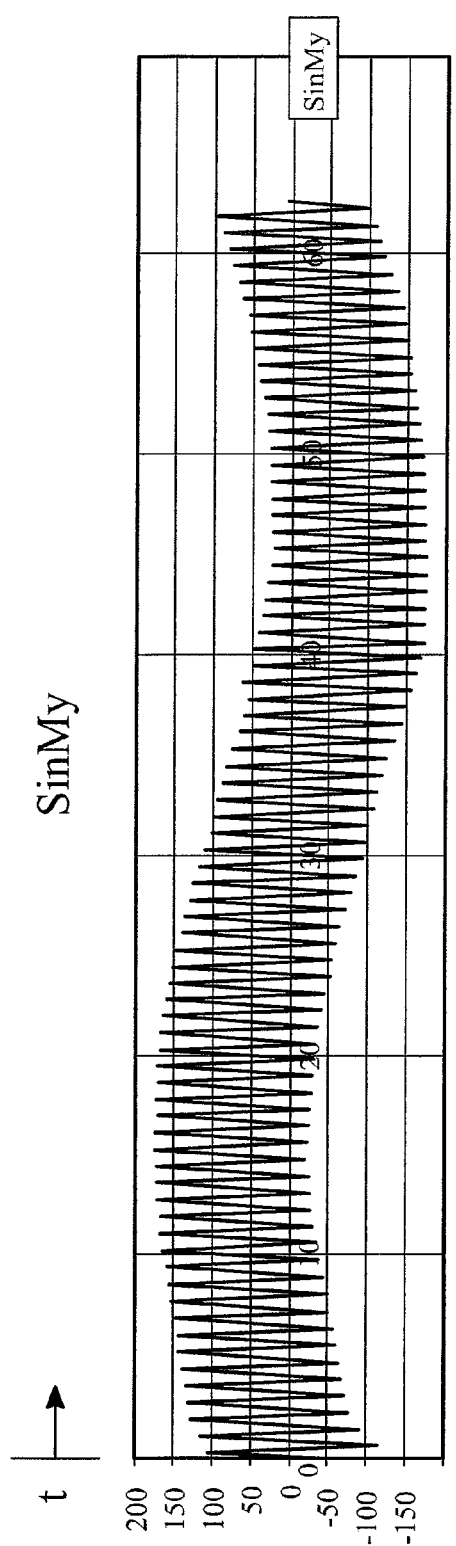
Figure 4C:
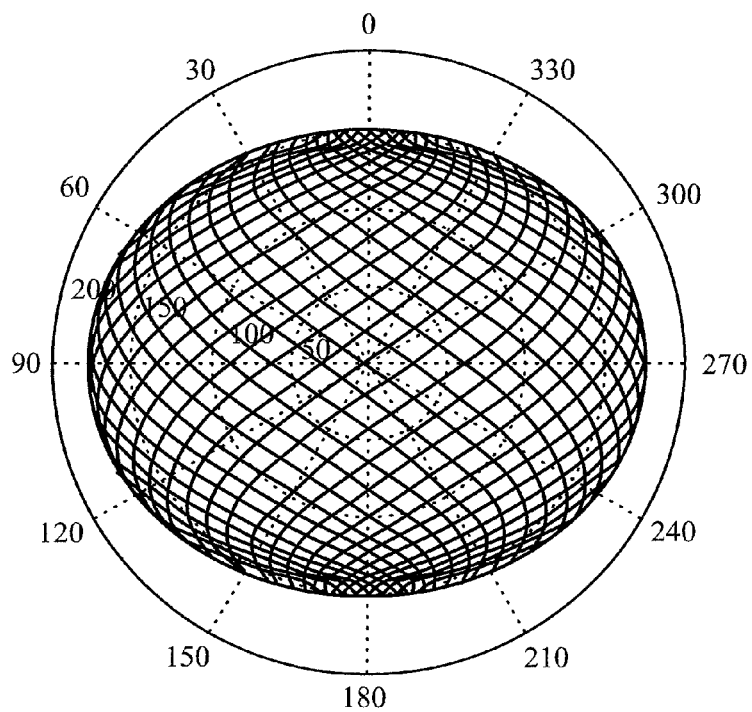
FIG. 4C is a graph showing the displacement of the actuator of FIGS. 4A and 4B summed to give the profile in two planes.

FIGS. 4A and 4B illustrate displacement over time t at a single point reference in one plane, for example at a free end 114 of one of the actuators 104 of FIG. 2. In FIG. 4A, the reference sin Mx is the displacement in the flapwise direction. It is constant maximum amplitude or, in other words, a fixed mean reference. In FIG. 4B, the reference sin My is in the edgewise direction. It shows the reference through a single sequence or sequence time. It is two sine waves added together. One with a frequency corresponding to the edgewise resonance frequency and the other, clearly, of a frequency of 1/sequence time. In other words, the mean reference position is shifted to give the desired loading profile. The graph of FIG. 4C shows the displacements of FIGS. 4A and 4B summed to give the displacement profile, of a single sequence, in two planes (flapwise and edgewise).

Figure 5:
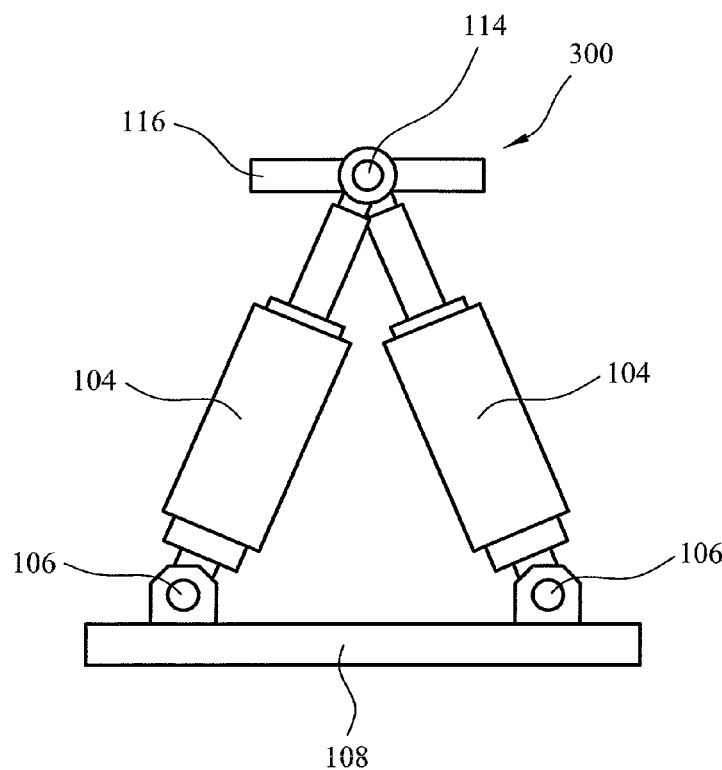
FIG. 5 is a side view of a portion of a wind turbine blade tester embodying an aspect of the present invention.

An example portion of a wind turbine blade tester 300, similar to that of the corresponding portion of the wind turbine blade tester 100 of FIG. 2, is shown in FIG. 5 and like features have been given like reference numerals. In the portion of the wind turbine blade tester of FIG. 5, the actuators 104 are not spaced apart at their free ends 114. In other words, the ends of the hydraulic actuators are coaxial.

Figure 6:
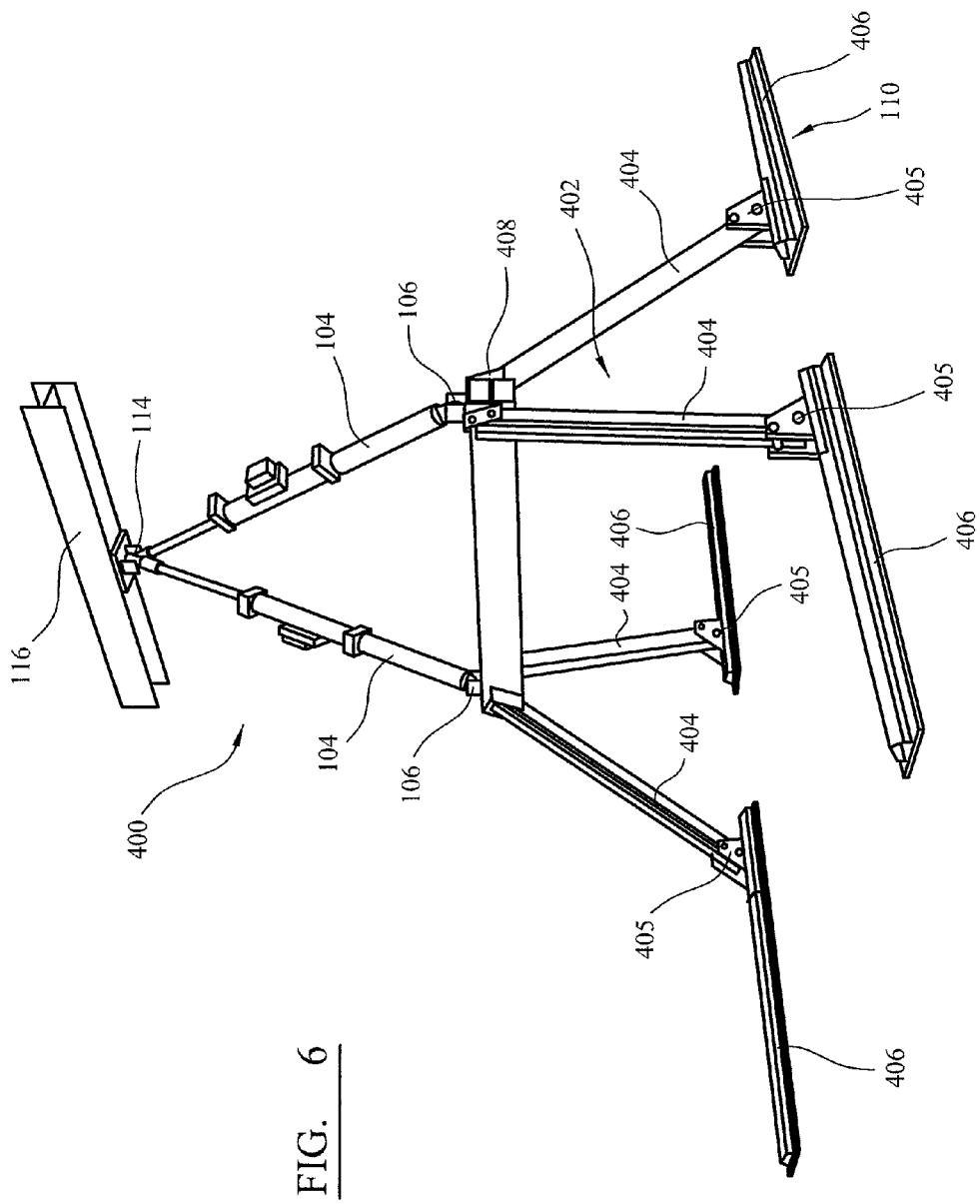
FIG. 6 is a perspective view from below of a wind turbine blade tester embodying an aspect of the present invention.

FIG. 6 shows another example wind turbine blade tester 400. It too is similar to the arrangement of FIG. 2 and like features have been given like reference numerals. In a similar fashion to the example tester of FIG. 5, the tester of FIG. 6 has hydraulic actuators 104 with coaxial free ends 114. In contrast to the examples of FIGS. 2 and 5, the base end 106 of the hydraulic actuators is mounted to a framework 402 to hold the actuators to the ground, and also to raise the base end of the hydraulic actuators from the ground 110.

The framework 402 includes legs 404 with feet 405 that rest on and are slideable along rails 406 on the ground. There is a pair of legs on each side of a beam 408 on which the ends 106 of the actuators 204 are located. Sliding the legs of each pair along the rails away or together from each other changes the spacing between them, to lower or raise beam and thus the actuators. Flexibility provided by the height adjustment of this arrangement allows it to be used to test different blades with different mean test displacements. Further lateral bracing (not shown) may be provided. Torsion experienced by the framework is reduced or minimised by matching the frame angle with the actuator angle when at rest. In other words, making the angle between the legs the same as the angle between the actuators when at rest. In this arrangement, reactive forces in the actuators follow the vector in which they lie. That is to say, no bending will be induced.

Figure 7:
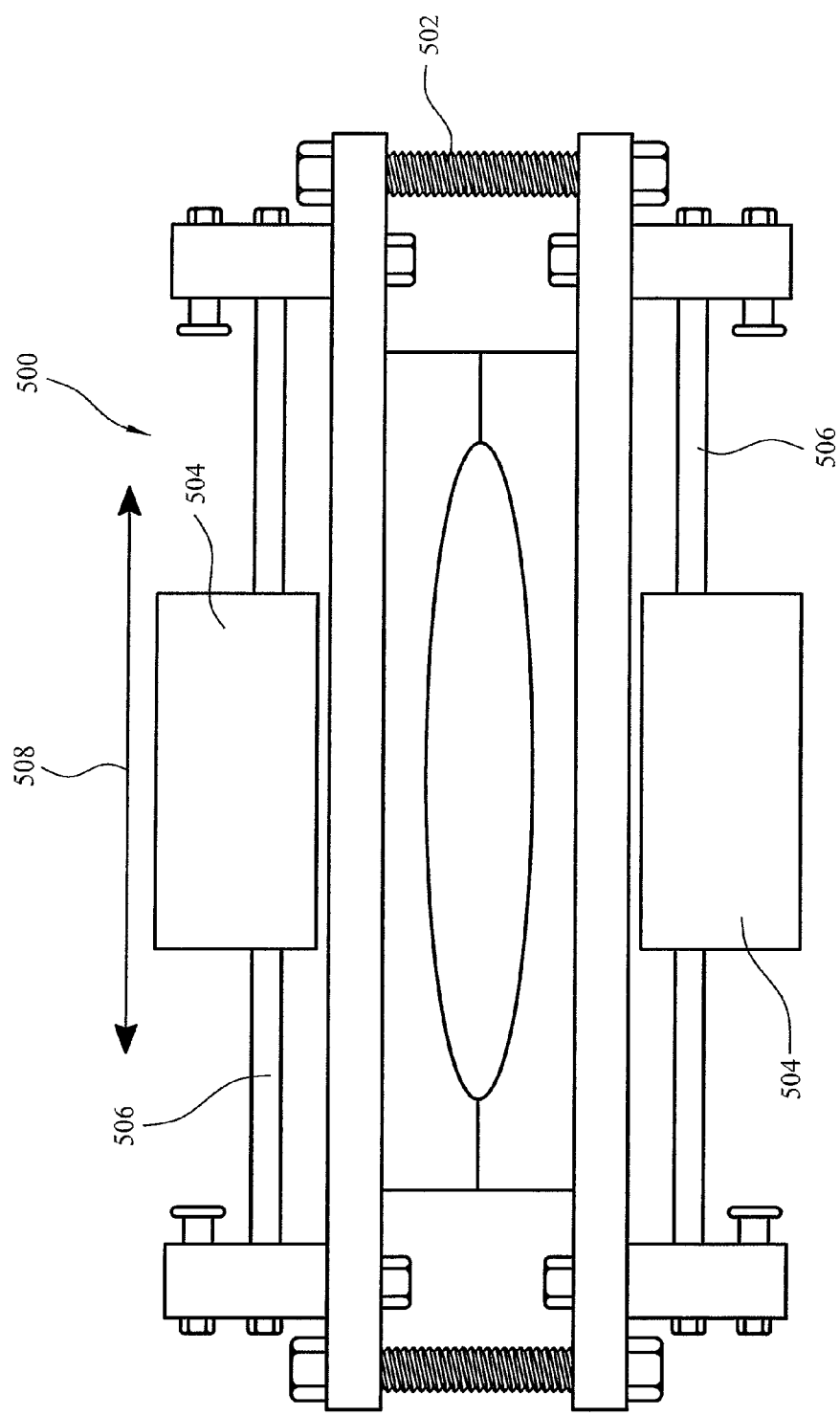
FIG. 7 is an end view of an arrangement for clamping to a wind turbine blade being tested.

It is desirable to achieve a correct bending moment profile across the whole blade during flapwise and edgewise fatigue testing. To achieve this, in some testing configurations, an outer portion of the blade may require added mass in the flapwise direction and, in particular, a structure for locating on the wind turbine blade being tested that includes a mass moveable in one and only one axis. This is achieved using a mass with one translational degree of freedom in the edgewise direction. Such an arrangement 500 is illustrated in FIG. 7. It includes a clamp 502 for clamping the arrangement to the wind turbine blade at the required position along the blade spaced from the root of the blade. Masses 504 on either side of the clamp are located on sliders or bars 506 that extend across the surface of the blade, in this example, in the edgewise direction, so that the masses can move or slide in the edgewise direction indicated by arrow 508. In use, as the blade oscillates, the masses slide in the edgewise direction only. Thus, they only provide an effective mass in the flapwise direction.

While testing has been described on full-size blades, the test arrangement could be applied to a wind turbine blade in the form of a scaled model of a full-size blade. For large blades (for example with a length of 50 m or more), such as those expected to be designed over the coming years, the inboard portions of these blades are the most critical and subjected to the highest biaxial fatigue load ratio. Testing would then target this area, with outboard sections tested at relatively low levels. Thus, biaxial testing could be carried out on scaled models to investigate the effects within the root section.

The invention has been described with reference to example implementations, purely for the sake of illustration. The invention is not to be limited by these, as many modifications and variations would occur to the skilled person. The invention is to be understood from the claims that follow.

What is claimed is:

1. A wind turbine blade tester comprising a pair of linearly reciprocable actuators each arranged to deliver a stroke to a wind turbine blade being tested and arranged to be connected to the ground, the stroke delivered by each of the actuators providing a controlled force in both the edgewise and flapwise directions.

2. The wind turbine blade tester according to claim 1, wherein the actuators are both arranged to deliver a stroke to the same side of the wind turbine blade being tested.

3. The wind turbine blade tester according to claim 1, wherein each of the actuators is separately controlled.

4. The wind turbine blade tester according to claim 3, wherein each of the actuators is separately controlled by a closed loop controller.

5. The wind turbine blade tester according to claim 1, wherein the actuators comprise hydraulic actuators.

6. The wind turbine blade according to claim 1, wherein one of the actuators is at an acute angle and the other is at an obtuse angle to the ground.

7. The wind turbine blade according to claim 1, wherein the actuators are arranged at an acute angle to one another.

8. The wind turbine blade tester according to claim 7, wherein the acute angle between the actuators is less than 70°.

9. The wind turbine blade tester according to claim 7, wherein the acute angle between the actuators is less than 45°.

10. The wind turbine blade tester according to claim 7, wherein the acute angle between the actuators is less than 35°.

11. The wind turbine blade tester according to claim 1, wherein the ends of the actuators are spaced apart at the wind turbine blade being tested.

12. The wind turbine blade tester according to claim 1, wherein the end of the actuators are coaxial at the wind turbine blade being tested.

13. The wind turbine blade tester according to claim 1, further comprising sensors for mounting spaced apart along the wind turbine blade being tested.

14. The wind turbine blade tester according to claim 13, wherein the sensors comprise strain gauges.

15. The wind turbine blade tester according to claim 13, wherein at least some of the sensors are adapted to measure strain in two orthogonal directions of the wind turbine blade being tested.

16. The wind turbine blade tester according to claim 1, further comprising a structure for locating on a wind turbine blade being tested, the structure including a mass moveable along one and only one axis.

17. The wind turbine blade tester according to claim 16, wherein the one and only one axis is in the edgewise direction of the wind turbine blade being tested.

18. The wind turbine blade according to claim 16, wherein the structure is arranged such that the mass slides along the axis during testing.

19. A wind turbine blade tester comprising a pair of linearly reciprocable actuators each arranged to deliver a stroke to a wind turbine blade being tested, the stroke delivered by each of the actuators providing a controlled force in both the edgewise and flapwise directions, wherein the actuators are each inclined at an angle relative to the wind turbine blade being tested.

20. A method of testing a wind turbine blade comprising:
providing a wind turbine tester having a pair of linearly reciprocable actuators arranged to deliver a stroke to the wind turbine blade being tested, wherein each of the actuators are connected to the ground; and
controlling both of the actuators so both deliver a stroke to the wind turbine blade being tested with a force in both the edgewise and flapwise directions.

* * * * *